United States Patent [19]

Stull et al.

[11] 3,952,505

[45] Apr. 27, 1976

[54] HIGH PERFORMANCE RAMJET FUELS

[75] Inventors: Bertram O. Stull; David M. Bullat, both of Ridgecrest, Calif.

[73] Assignee: The United States of America as represented by the Secretary of the Navy, Washington, D.C.

[22] Filed: July 26, 1974

[21] Appl. No.: 493,444

[52] U.S. Cl. ................................................. 60/219
[51] Int. Cl.² ........................................... F23R 1/14
[58] Field of Search ........................................ 60/219

[56] References Cited
UNITED STATES PATENTS 3,695,952  10/1972  Allen ................................. 149/19.9
3,758,426  9/1973  Boivin et al ......................... 149/19.9

Primary Examiner—Leland A. Sebastian
Attorney, Agent, or Firm—R. S. Sciascia; Roy Miller; Lloyd E. K. Pohl

[57] ABSTRACT

Solid ramjet fuels made up of mixture comprising hydroxy terminated polybutadiene or the like in combination with other hereinafter specified hydrocarbons are disclosed. When combusted, in the presence of air, the fuels of this invention exhibit combustion efficiencies similar to that of hydroxy terminated polybutadiene alone.

3 Claims, 2 Drawing Figures

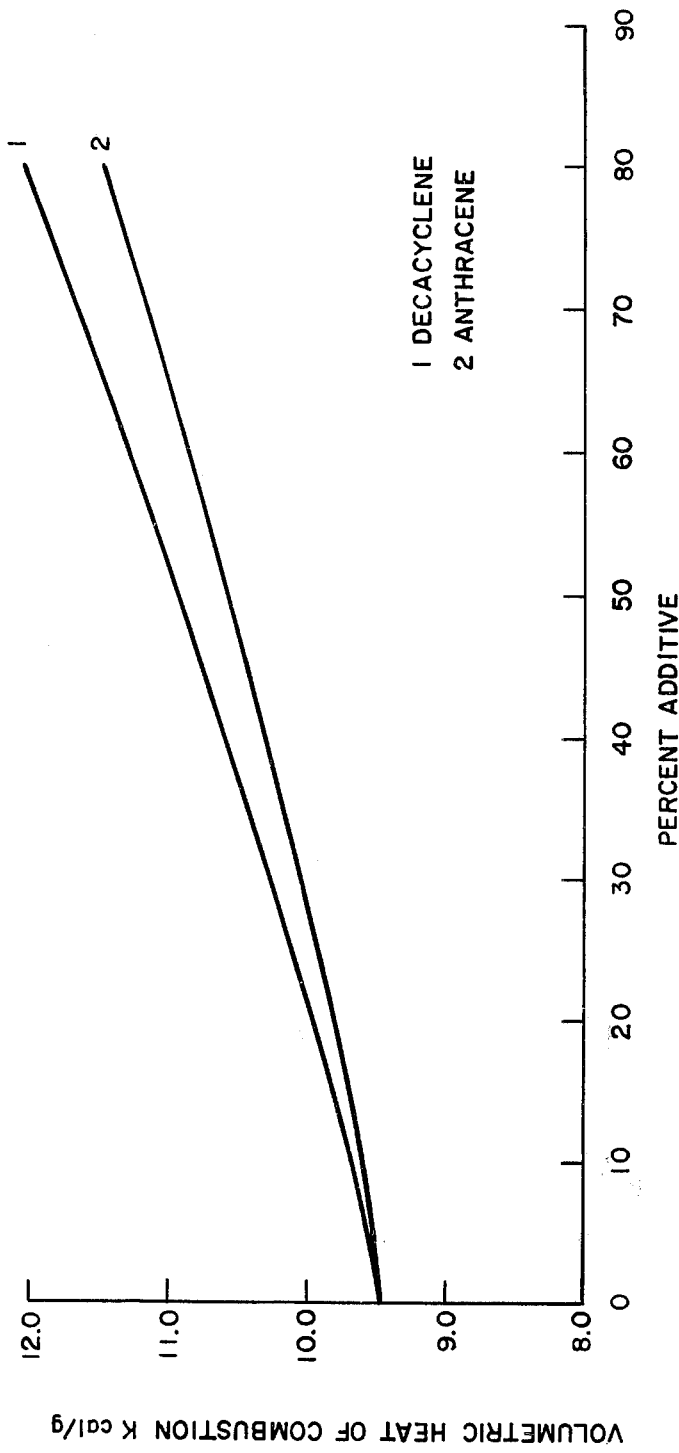

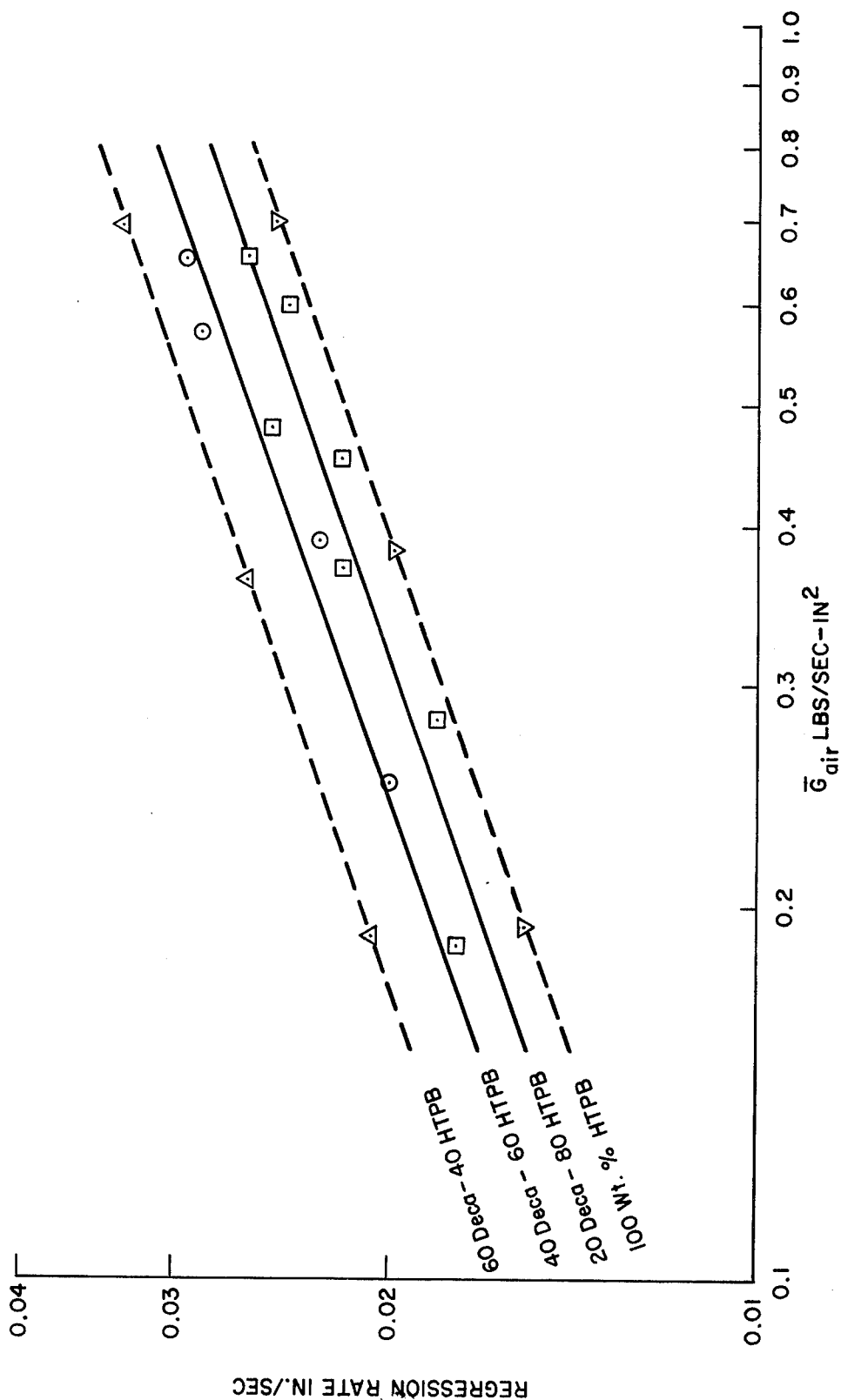

HIGH PERFORMANCE RAMJET FUELS

BACKGROUND OF THE INVENTION

1. Field of the Invention.

This invention relates to solid fuels for use in rocket ramjet applications.

2. Description of the Prior Art.

Ramjet engines which utilize solid fuels are known. In such engines a combustion chamber is lined with the solid fuel, air is used as the oxidizer and the fuel is combusted to propel the engine. Such engines are often volume limited. That is, while weight may be a consideration in engine design, volume is usually the subject of more critical consideration.

In considering what fuel one wishes to use in a volume limited situation, one must consider the density of the fuel. The fuel should have a relatively high density.

In considering what fuel to use in a volume limited situation, one must consider the heat of combustion per unit volume of the fuel. The fuel should have a high volumetric heat of combustion.

And finally, in considering what fuel to use in a volume limited situation, one must consider the actual performance obtained when unit volume of fuel is burned. No matter what the theoretical volumetric heat of combustion is, the fuel is simply not useful as such unless good combustion efficiency is obtained. That is, a fuel with a high theoretical volumetric heat combustion may be less useful than one with a relatively lower volumetric heat of combustion if the one with the lower value burns more efficiently. Combustion efficiency can only be determined by actual experimentation. That is, one cannot predict, with absolute certainty, that a fuel will burn efficiently by simply knowing the properties of the fuel. Combustion efficiency depends, to a large extent, on stay time which, in volume limited situations, is naturally of short duration. And, of course, combustion efficiency depends on ignition temperature. If a fuel will not ignite at temperatures produced within the combustion chamber, it simply isn't useful in that particular combustion chamber.

At the present time, hydroxy terminated polybutadiene alone is the most predominantly used solid ramjet fuel. While hydroxy terminated polybutadiene works admirably well, it would be desirable to have ramjet fuels which had higher densities, higher theoretical volumetric heats of combustion and which burned as efficiently or more efficiently than hydroxy terminated polybutadiene. It is, accordingly, the primary object of this invention to provide such fuels.

SUMMARY OF THE INVENTION

According to this invention, mixtures of hydroxy terminated polybutadiene and certain other hereinafter specified hydrocarbons are used as solid ramjet fuels. The fuels of this invention have higher densities and higher theoretical k-cal/cc values than does hydroxy terminated polybutadiene alone and burn with combustion efficiencies similar to that of hydroxy terminated polybutadiene.

BRIEF DESCRIPTION OF THE DRAWING

FIG. 1 is a graph showing how the theoretical volumetric heat of combustion changes as decacyclene and anthracene are added to hydroxy terminated polybutadiene.

FIG. 2 is a graph showing regression rates for various decacyclene-hydroxy terminated polybutadiene mixtures.

DESCRIPTION OF THE PREFERRED EMBODIMENTS

Fuels according to this invention can be prepared by methods utilized in the preparation of solid rocket propellant grains in which hydroxy terminated polybutadiene is a commonly used binder material. That is, solid hydrocarbon particles may be mixed with uncured hydroxy terminated polybutadiene (HTPB) in the manner in which metallic fuel particles are mixed with uncured HTPB in the preparation of rocket propellant grains and then the mixture can be cast and cured in the ramjet combustion chamber.

Going now to he drawing, FIG. 1 is a graph showing the theoretical volumetric heat of combustion obtained by adding decacyclene and anthracene to HTPB. It will be noted from the drawing that the theoretical volumetric heat of combustion increases as the amount of additive (decacyclene or anthracene) is increased. Therefore, if the actual combustion efficiencies obtained when mixtures of combinations of HTPB with either decaclene or anthracene approach that of HTPB alone, combinations of HTPB with either decacyclene or anthracene should surpass HTPB alone as a ramjet fuels. In actual tests, combustion efficiencies on the order of 80 percent have been obtained for combinations of HTPB with decacyclene and of HTPB with anthracene. The combustion efficiency of HTPB alone is on the order of 80 percent.

The following table presents a list of coal tar derivatives having properties similar to those of anthracene and decacylene.

TABLE

| | |
|---|---|
| Azulene | Ovalene |
| Benzanthracene | Phenanthrene |
| Benzo (ghi) fluoranthene | Phenylanthracene |
| Benzopyrene | Phenylenepyrene |
| Binaphthyl | Phenylnaphthalene |
| Chrysene | Picene |
| Coronene | Pyrene |
| Dibenzanthracene | Rubrene |
| Fluoranthene | Tetraphenyl Pyrene |
| Hexabenzocoronene | Tetrabenzonaphthalene |

The densities of the compounds in the Table range from a low of 1.17 for benzofluorene to a high of 1.54 for ovalene and the heats of combustion range from about 9.00 k-cal/g to about 9.50 k-cal/g. All of the compounds in the Table can be mixed and cast with HTPB in the manner described above. Therefore, mixtures of HTPB with any of the compounds in the Table should surpass HTPB alone. However, combustion efficiency data on combinations of HTPB with any of the compounds in the Table other than decacyclene and anthracene has not been obtained to date.

In addition to finding that combinations of HTPB with either decacyclene or anthracene burn with combustion efficiencies on the order of 80 percent, it has been found that the regression rate may be tailored by properly selecting the ratio of the additive (decacyclene, anthracene, etc.) to HTPB. FIG. 2 is a graph showing the regression rate produced when various combinations of decacyclene and HTPB are used. It will be noted that, as the decacyclene content is increased and the HTPB content is decreased, the regression rate increases. Regression rates for anthracene-HTPB mixtures are similar to those shown in FIG. 2 for decacyclene-HTPB mixtures.

Mixtures containing from 1 up to 80 weight percent of either decacyclene or anthracene and from 99 to 20 weight percent HTPB may be readily prepared using the techniques described above. The addition of more than 80 weight percent decacyclene or anthracene, while being feasible, would require special processing techniques for grain fabrication because of viscosity limitations.

What is claimed is:

1. In a method for propelling a ramjet engine wherein a solid fuel is combusted in the presence of air within a combustion chamber and gases produced by the combustion process are exited through a nozzle to propel the engine, the improvement residing in utilizing as said solid fuel a composition comprising a combination of hydroxy terminated polybutadiene and a member selected from the group of high density additives consisting of anthracene and decacyclene.

2. In a method according to claim 1, the further improvement residing in said solid fuel comprising about 99 to 20 weight percent hydroxy terminated polybutadiene and about 1 to 80 weight percent of the member selected from the group of high density additives consisting of anthracene and decacyclene.

3. In a method according to claim 2, the further improvement residing in tailoring the regression rate of said solid fuel by controlling the amount of said high density additive used.

* * * * *